United States Patent [19]
Krogh

[11] Patent Number: 5,626,515
[45] Date of Patent: May 6, 1997

[54] METHOD AND APPARATUS FOR FIXATION OF A CUT OPEN, AT THE HIND LEGS SUSPENDED CARCASS OF A SLAUGHTER HOG

[75] Inventor: Knud Krogh, Indkildevej, Denmark

[73] Assignee: Danfotech & Slagteriernes Forskningsinstitut, Denmark

[21] Appl. No.: 535,144

[22] PCT Filed: Apr. 22, 1994

[86] PCT No.: PCT/DK94/00161

§ 371 Date: Oct. 20, 1995

§ 102(e) Date: Oct. 20, 1995

[87] PCT Pub. No.: WO94/24873

PCT Pub. Date: Nov. 10, 1994

[30] Foreign Application Priority Data

Apr. 26, 1995 [DK] Denmark .................. 0471/93

[51] Int. Cl.$^6$ .................. A22B 5/06; A22B 5/20
[52] U.S. Cl. .................. 452/187; 452/160
[58] Field of Search .................. 452/187, 160, 452/189

[56] References Cited

U.S. PATENT DOCUMENTS

| | | | |
|---|---|---|---|
| 3,402,426 | 9/1968 | Wexel | 452/160 |
| 4,337,550 | 7/1982 | Baylor et al. | 452/160 |
| 4,779,307 | 10/1988 | Van Der Hoorn | 452/160 |
| 4,841,602 | 6/1989 | van der Hoorn et al. | 452/160 |
| 4,873,749 | 10/1989 | Couturie | 452/187 |
| 4,970,756 | 11/1990 | Durand | 452/160 |

FOREIGN PATENT DOCUMENTS

| | | | |
|---|---|---|---|
| 139373 | 2/1979 | Denmark. | |
| 144551 | 3/1982 | Denmark. | |
| 365452 | 4/1990 | European Pat. Off. | 452/187 |
| 2507201 | 8/1975 | Germany | 452/160 |
| 224205 | 7/1985 | Germany | 452/160 |

*Primary Examiner*—Willis Little
*Attorney, Agent, or Firm*—Kerkam, Stowell, Kondracki & Clarke, P.C.; Edward J. Kondracki

[57] ABSTRACT

Method for fixation of cut up carcasses of slaughter hogs (3), which are suspended at their hind legs and which have been eviscerated after the cutting, during which fixation in particular the spinal column of the hog is aligned relative to the median plane of the carcass by means of a member (10) clutching the snout of the animal, said member exerting a downwards pull to stretch out the animal during the cutting of the carcass, or for processes requiring a similar fixation. To attain an exact fixation of the pelvic region of the carcass independent of imbalances in the suspension of the legs, a method has been suggested which comprises the following steps: a measuring of the level at which the pubic bone (16) of the carcass is placed; introduction under the pubis bone (16) of the carcass of a carrier means (15) having a pair of fingers which can be spread out in a horizontal plane by a movement away from each other and which are adapted, when raised, to get into contact with the pubic bone and then to lift the pelvic region of the carcass in relation to the measured level prior to or in connection with the stretching of the carcass. Moreover, an apparatus for the splitting of carcasses by use of the method is provided.

29 Claims, 2 Drawing Sheets

5,626,515

METHOD AND APPARATUS FOR FIXATION OF A CUT OPEN, AT THE HIND LEGS SUSPENDED CARCASS OF A SLAUGHTER HOG

BACKGROUND OF THE INVENTION

1. Field of the Invention

The present invention relates to a method for fixation of cut up carcasses of slaughter hogs, which are suspended at their hind legs and which have been eviscerated after the cutting, during which fixation in particular the spinal column of the hog is aligned relative to the median plane of the carcass by means of a member clutching the snout of the animal, said member exerting a downwards pull to stretch out the animal during the cutting of the carcass, or for processes requiring a fixation of the carcass relative to a median plane. Moreover, the invention relates to a apparatus for carrying out the method when splitting or blankfinning the carcass.

2. Prior Art

When splitting or blankfinning carcasses by means of automatic tools it is important in order to attain a satisfactory result that the carcass is placed accurately opposite the tools and that curvatures or bendings of the spine, if any, is straightened out, if possible. A known apparatus for the centering of gutted carcasses suspended at their hind legs and which are to be backsplitted, comprises a stretching means for engaging the lower jaw. The apparatus, which is described in Danish Patent no. 139,373, moreover comprises a supporting device resting against the belly of the animal, as well as hooks clutching the hind legs of the animal close to the suspension hooks. From the specification to Danish Patent No. 144,551 an arrangement is known which comprises guiding rollers, which roll along the backbone of a carcass to be backsplitted is known. These rollers, which roll partly against the inner side of the spinal column in the abdominal cavity of the carcass, partly on the outer side, are to a certain extent able to align an obliquely suspended carcass. However, these rollers do not become effective until they have moved somewhat along the spinal column, and they have only a slight effect on the portion of the spinal column from the pelvic region to where the ribs start. If the carcass has not been correctly suspended on the carrier yoke, or separate hooks have been used which have not been inserted in the same way in the two hind legs or have a different size, so big curvatures of the spinal column may occur exactly in the area between the pelvic section and the area, where the ribs start, that when splitting the spinal bone it is not possible to attain a pure cut hitting exactly through the middle of the spinal column. The same conditions apply in blankfinning, where a pair of tools is to be taken along the dowels of the spinal column to free the muscles placed along the spinal column. Moreover, similar conditions apply, if instead of splitting the carcass a more extensive direct cutting is to be made, while the carcass is still suspended at the hind legs.

When splitting hog carcasses with a saw passed through the spinal column there is, at the beginning of the sawing, a risk that the hams of the animal will be damaged by the saw blade. On account of this risk it is common to introduce the saw at a level fairly low relative to the pelvic region, which puts a big load on the blade, as it is engaged at the same time over a very big part of its periphery. It is therefore desirable, if the hams can be spread before the cutting process starts, but this is not possible if the animals are suspended on a yoke which is common for the two legs, and if two separate hooks are used, unbalances, if any, in the suspension will be enhanced.

OBJECT OF THE INVENTION

It is the object of the present invention to provide a method, by which a better fixation is attained than what has previously been attainable by stretching the carcass and by simultaneous support thereof by rollers, which from the abdominal cavity and from the outside rest against the spinal column or immediately next thereto.

This object is met by the method according to the invention. This method is characteristic by the subject matter of the characterizing clause of claim 1.

In the method according to the invention the condition is exploited that by freeing the rectum a throughgoing free opening has been established behind the part of the pelvic region called the key bone and which corresponds to the pubic bone of a human skeleton. This bone has normally been cut at the evisceration into a cartilage part, called the lock, but irrespective of whether the lock has been cut or not, a carrier means can be introduced under the two bone ends. As this relief takes place equally on both bone ends simultaneously with a relief of the legs, the carcass will, by means of the pull at the snout, become effectively stretched. Moreover, the relief causes a certain spreading of the hams, which reduces the risk of a damage thereof by the splitting of the carcass. The effective alignment and stretching of the carcass is just as suitable for blankfinning as for splitting. The fixation is also applicable in connection with any kind of division of the carcass, where the backbone is left as one of the last parts of the animal to be cut.

According to the invention it has turned out that it is sufficient if the fingers, after the introduction, are spread to a predetermined value, the musculature being in this area sufficiently smooth to compensate for individual differences between the individual carcasses.

Moreover, it has proved advantageous that the carrier means after the introduction is raised to a predetermined height above the measured level. In practice it is sufficient to raise the carrier means a few centimeters in relation to the measured height, which will relieve the pull in the legs without any risk arising that the hooks slacken their grip on the rails, on which they are suspended. By raising the carrier means a fixed distance, the need for more sophisticated pressure or weight measurements is eliminated.

Moreover, the invention relates to an apparatus for the cutting through or the blankfinning of hogs to be slaughtered which are suspended at their hind legs and which are cut up in the belly side and eviscerated, and in which the carcass is fixated, said apparatus comprising a member which clutches the snout of the hog and exerts a downwards pull thereon.

The apparatus comprises a measuring station and a process station, which may be integral or be two stations placed in extension of each other on a common transport device. The level or height, at which the pubic bone is present, is registered by means of a measuring rod introduced in the median plane of the carcass, said rod being taken upwards until it is met with resistance from the pubic bone. By registration of the level, where this happens, the starting point for the introduction of the carrier means can be set. The carrier means is introduced into the pelvic cavity of the animal and hits exacly below the pubic bone, the fingers being advanced in their longitudinal direction. After the advancing of the fingers a vertical movement is made, which movement relieves the pull in the legs of the carcass.

The preferred embodiment of the measuring station is shown in FIG. 2. It is preferable that the measuring rod has a plane surface in order to eliminate the risk that the measuring rod completely or partially passes the split lock between the pubic bones. Moreover, the rod is provided with a roller at the end, whereby the risk that a false signal is registered if the rod hits the spinal column under the pubic bone is eliminated. The measuring is made thereby that the rod and the pivotal joint are lifted by means of the movable slide, until contact with the pubic bone is registered, following which the measuring rod is telescopically withdrawn and the slide returns to its starting position.

The process station comprises a slide which is displaceable substantially in vertical direction, said slide being provided with a pivotal joint placed high up relative to the carcass for a carrier arm on the carrier means, the fingers of which form an angle with the carrier arm. By placing the pivotal joint above the carrier means, the carrier means gets a suitable movement which corresponds exactly to the opening, through which the rectum was freed. Moreover, the slide, which gives the lifting movements, is mounted high up, for which reason it cannot get in the way of the further equipment, which is to be introduced into the pelvic cavity for fixation of the carcass.

To ensure that the carrier means is easy to introduce into the cut up belly side of the carcass and moreover to ensure that its fingers cannot loose their grip under the pubic bone, which has been divided in two, the distance between the fingers of the carrier means are at the upper edge bigger than at the lower edge. Thereby also an effective pressing of the musculature for spreading the hams of the carcass is ensured.

It is preferred to spread the fingers to a fixed distance. Such a distance is 7–9 cm.

Likweise, it is preferred, for the sake of simplicity of the construction, that the slide of the carrier means is adapted to lift the hind part of the carcass a predetermined distance. A suitable value of the lifting height is 4–7 cm.

BRIEF DESCRIPTION OF THE DRAWINGS

The invention will be described in detail in the following with reference to the drawing, in which.

DESCRIPTION OF THE PREFERRED EMBODIMENT

Figure 1:
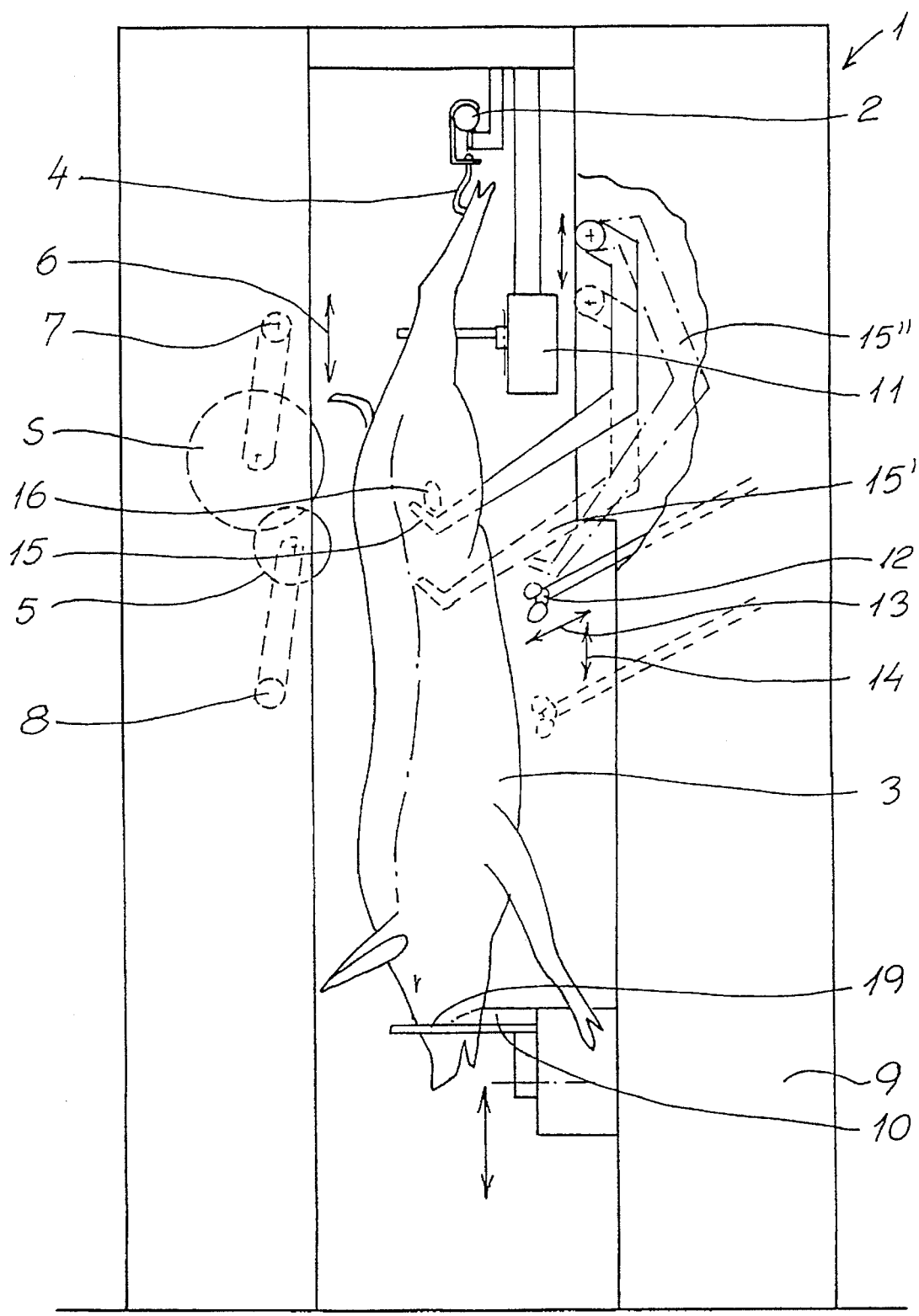
FIG. 1 shows an apparatus for the splitting of the carcass of a hog, by means of which apparatus the carcass is fixated in accordance with the method according to the invention.

The apparatus shown in FIG. 1 for the splitting of a hog carcass is shaped like a portal 1 placed over a carrier rail 2, on which the carcasses 3 to be split are suspended by means of hooks 4 inserted in the hind legs of the carcass. In one side of the portal the tools, with which the carcass is to be treated, are positioned. In the embodiment shown the tools are a rotating saw blade S and a guide roller 5 placed immediately below. The saw blade S and the guide roller 5 are placed on a vertically movable slide, which during the cutting and the return stroke can make a movement as indicated by the double arrow 6. The saw blade is journalled on a carrier arm which is pivotal around a pivotal joint 7. The guide roller 5 is likewise journalled on a carrier arm which is pivotal around a pivotal joint 8. Simultaneously with a downwards movement of the slide, on which the saw blade and the guide roller are mounted, the saw blade S and the guide roller can be swung forwards to engage the carcass. During the return stroke the saw blade and the guide roller 5 is pulled back so that they do not extend into the free opening of the portal. Instead of a rotating saw blade the tools contained in one side of the portal may consist of instruments for blank-finning of the carcass or knives and/or saws for the cutting up of the carcass, as the various pieces of meat are cut away from the spinal column, which is not divided until the remaining carcass is taken out of the apparatus.

The second part 9 of the portal 1 contains the means necessary for fixation of the carcass 3. These means comprise a gripping hook 10 adapted to fixate the head of the carcass and to stretch out the carcass by a downwards pull, and a leg centering device 11 ensuring that the hind legs are placed in a correct distance from and exactly symmetrical relative to the median plane, in which the saw works, or relative to which the alternative tools are adjusted. Furthermore, the part 9 may contain a belly guide 12, which is telescopically displaceable in the direction of the arrow 13 and which contains one or more pairs of rollers adapted to be moved along the spinal column of the carcass and opposite the guide roller 5. For carrying out the vertical movement corresponding to the guide roller 5, the belly guide 12 is placed on a slide which is vertically movable, the belly guide becoming thereby movable in the direction of the double arrow 14 from the fully drawn position 12 to the position 12' shown with dotted lines.

It has, however, turned out that in particular unbalances at the suspension in the hooks 4, but also structural defects in the carcass get the consequense that the spinal column in the area from the pelvis to the area, in which the guide (5) roller and the belly guide (12) become effective, viz. where the vertebras each carry a rib, is not positioned accurately in the intended median plane. It has also turned out that the deviation does not decrease by an increase of the pull exerted by the gripping hook 10. According to the method according to the invention the carcass is therefore fixated by an additional carrier means 15 adapted to relieve the pull, which the gripping hook 10 and the weight of the carcass exert on the carrier hooks. The carrier means comprises a pair of fingers 15 adapted to be introduced trough the cut up belly side of the carcass for engaging the pubic bone 16 of the animal. The pubic bone is a bone in the pelvis, which in the median plane of the animal is grown together with a cartilage part called the lock. In certain cases, the lock will have been cut in connection with the freeing of the rectum and opened somewhat. The two fingers 15 are therefore introduced into the carcass with a distance of 2–3 cm and are after the introduction spread to a somewhat bigger distance against the muscles placed in the floor of the pelvis. By this spreading the pelvis of the carcass is fixated relative to the median plane, from which the tools operate. It is preferable to introduce the carrier means in the abdominal cavity at a level, which is positioned under the pubic bone 16. The carrier means is therefore mounted on a slide, which is movable in the direction of the arrow 17. The slide comprises a pivotal joint 18 for the carrier arm. In connection with the introduction the slide is lowered and the carrier arm swung forward towards the carcass to the position 15' shown with dotted lines. Then the carrier arm is lifted until it gets in contact with the pubic bone and further on until the desired relief of the hind feet has occurred. Simultaneously with this lifting, the gripping hook 10 is lowered, until the desired streching of the body has been attained. The gripping hook 10 comprises a pair of lateral control means 19 which bears against either side of the head and which ensures that also the head is positioned exactly in the medain plane. By the method described, the carcass will be stretched between the carrier means 15 and the gripping hook 10, while the hind legs will be substantially relieved, whereby the spinal bone will be stretched exacly in the median plane intended. It has turned out that with the apparatus described, it is possible to carry through a splitting of the carcass with great accuracy irrespective of whether the suspension has been made with the norally required accuracy or with a possibility for adjustment by use of a carrier yoke. When the desired cutting has taken place, the carrier means 15 is swung back to the position shown by 15", before a new carcass is introduced into the apparatus.

By the method according to the invention the gripping hook 10 and the carrier means 15 are preset to a correct height relative to the size of the carcass to be fixated. The presetting takes place for instance on basis of a measurement made by means of the apparatus shown in FIG. 2. The apparatus comprises a post 20 with a height measuring device 21 and a device 22 for measuring the length of the carcass. The height measuring device 21 comprises a measuring rod 23 which is telescopically displaceable in a horizontal direction, said rod being at its front end provided with a roller 24. The measuring rod 23 moves in a pivotally suspended journal bearing 25, which can perform a swinging movement around an axle journal 26. The axle journal is placed on a console which is vertically displaceable and which is lifted and lowered in the direction of the arrow 28 by means of a guiding cylinder 29. When measuring the position of the pubic bone the console 27 is lowered to its bottom position, and the measuring rod is advanced in the direction of the arrow 30 to its front position. Then the console 27 is raised until the measuring rod 23 is met by resistance from the pubic bone 31 of the carcass 32 placed in front of the apparatus. For the reason that the pubic bone may be cut over at the lock, the measuring rod 23 has a plane upper side with a suitably big width, so that the pubic bone will always be touched. The measuring rod 23 is at the end provided with a roller 24, which makes it retract, if its hits the abdominal wall, and not until the pubic bone is hit by the upper side of the measuring rod 23 is a registration made. The registration is performed by a tilting of the journal bearing, which makes a sensor 32 transmit a signal to a computer which controls the apparatus according to FIG. 1. After the registration the level measuring device is returning to its starting position.

Similarly, the length of the carcass is measured by means of the device 33. The device comprises a measuring plate 34, which by means of a console 35 guided on a guiding column 37 can be lifted up towards the snout of the animal in the direction of the arrow 36. When touching the snout, the measuring plate 34 is tilted, and the level, at which this happens, is registered. The plate is then returned to its starting position. The last registration is used for the adjustment of the gripping hook 10.

It has turned out that on basis of the levels measured it is possible to attain a uniform stretching of the carcass and relief of its legs by lifting the carrier means to a height predetermined in relation to the measured level of the pubic bone, which entails a lift of for instance 4–7 cm. Correspondingly, the stretching of the carcass may be carried out to a level, which in a similar way has been determined by a measurement of the length of the carcass. These values are also used for the adjustment of the length of the stroke of the saw and for adjustment of the level, at which the belly guide is to be advanced.

Figures 2, 3:
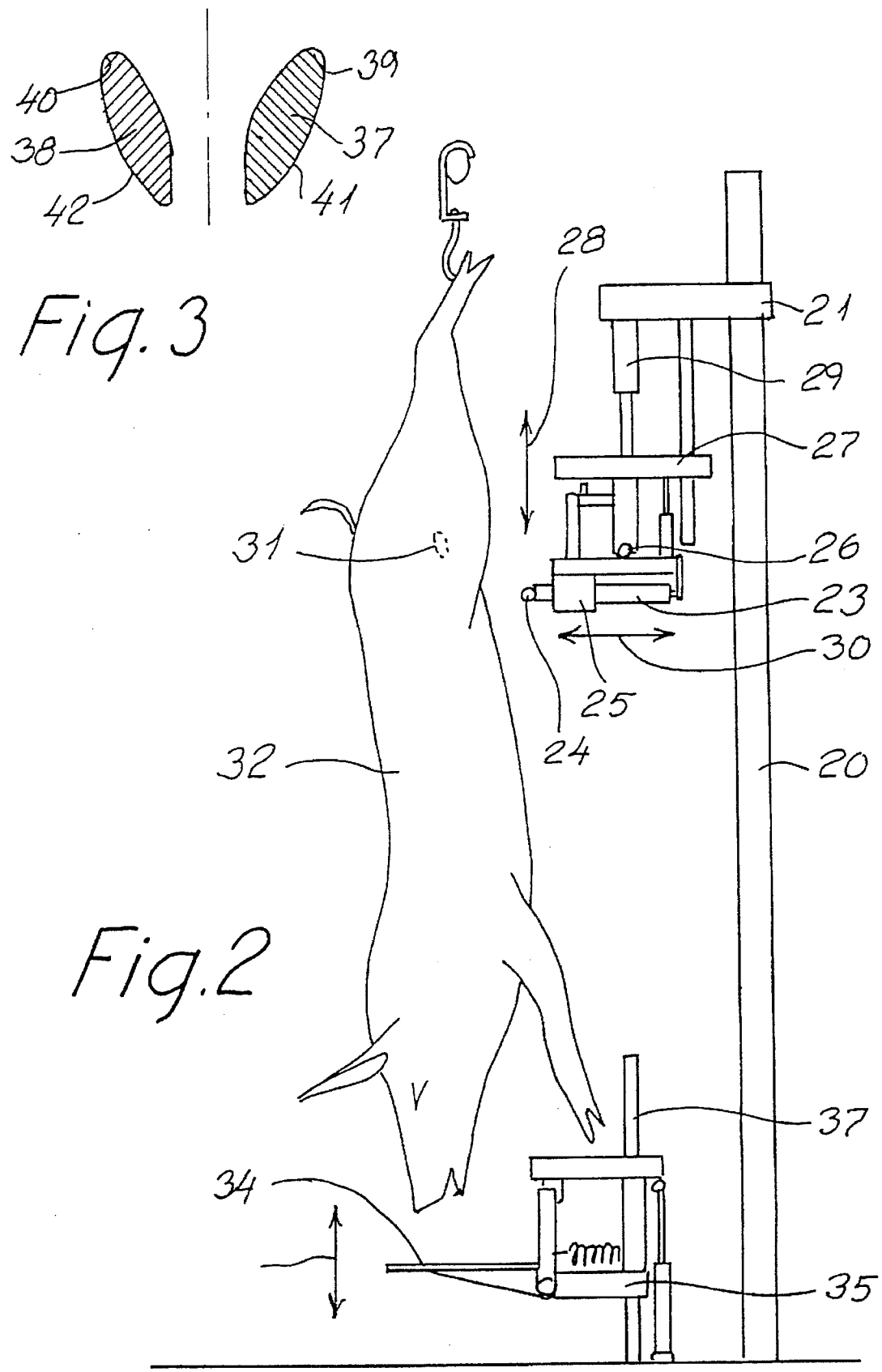
FIG. 2 shows a measuring station, in which the measurements necesssary for the fixation can be made.
FIG. 3 shows a cross section through the fingers on the carrier means.

FIG. 3 is a sectional view through the fingers 37,38 of the carrier means. To ensure engagement with the pubic bones the two upper edges 39,40 are placed with bigger mutual distance than the under sides of the fingers. The outer sides 41,42 are made with a suitable curvature, by means of which they can press aside the muscles placed around the pubic bone. After introduction in the abdominal cavity of the carcass, the two fingers are moved away from each other for the centering of the pelvic region relative to the median plane aimed at. It is preferable that the fingers are moved away from each other to a set distance of 7–9 cm.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

I claim:

1. A method for fixation of cut up carcasses of slaughtered animals (3), which are suspended by their hind legs and which have been eviscerated after the carcasses have been cut, each animal having, in particular, a spinal column, which during fixation is aligned relative to a median plane of the carcass by means of a member (10) clutching the animal by its snout, said member exerting a downwards pull to stretch out the animal during the cutting of the carcass, or for processes requiring a fixation of the carcass relative to a median plane, characterized in comprising the following steps:

measuring the height at which the pubic bone (16) of the carcass is placed, introducing a carrier under the pubic bone (16) of the carcass, said carrier (15) having a pair of fingers adapted to be spread out in a horizontal plane by a movement away from each other and raised, said fingers, when raised, being further adapted to contact the pubic bone in the pelvis region of the animal and then to lift the pelvic region of the carcass relative to the measured height prior to or in connection with the stretching of the carcass.

2. A method according to claim 1, characterized in that the fingers (37,38) of the carrier, after introduction under the pubic bone, are spread out to a predetermined distance.

3. A method according to claim 1, characterized in that the carrier (15), after introduction under the pubic bone, is raised to a predetermined height relative to the measured level.

4. A method according to claim 2, characterized in that the carrier (15), after introduction under the pubic bone, is raised to a predetermined height relative to the measured level.

5. Apparatus for splitting or blankfinning of carcasses of slaughtered hogs (3) which are suspended by their hind legs and which are cut in the belly side and eviscerated, and in which the carcasses are fixated, said apparatus having a member (10) for clutching a snout of the hog and exerting a downwards pull thereon, the invention being characterized in that the apparatus comprises a measuring station and a process station, the measuring station comprising a measuring rod (23) extending in a substantially horizontal direction and adapted to be introduced in a median plane of the carcass from the belly side and to perform a vertical upwards movement until it has to overcome a predetermined resistance against movement, means for registering the height at which the resistance against movement is overcome, and a carrier (15) disposed in the process station and adapted to take up a starting position corresponding to the registered height and from this starting position to perform a horizontal or diagonal upwards movement directed forwards towards the pubic bone (16) of the respective carcass, followed by a vertical upwards movement, the front part of the carrier comprising a pair of fingers, the direction of which is substantially identical with that of the directed forwards movement.

6. Apparatus according to claim 5, characterized in that the measuring rod (23) has a substantially plane surface and is telescopically displaceable and further includes a roller (24) at its front end, the rod being displaceably journalled in a telescopic bearing which is pivotally suspended and provided with means for registering a swing movement, the measuring rod and suspension being placed on a substantially vertically movable slide (27).

7. Apparatus according to claim 5, characterized in that the process station comprises a slide displaceable substantially in a vertical direction, said slide having a pivotal joint placed high up relative to the carcass for a carrier arm on the carrier, the fingers of which form an angle with the carrier arm.

8. Apparatus according to claim 6, characterized in that the process station comprises a slide displaceable substantially in a vertical direction, said slide having a pivotal joint placed high up relative to the carcass for a carrier arm on the carrier, the fingers of which form and angle with the carrier arm.

9. Apparatus according to claim 5, characterized in that the fingers (37,38) of the carrier have a cross-section extending obliquely in such a way that at the upper edge the distance is bigger than at the lower edge.

10. Apparatus according to claim 6, characterized in that the fingers (37,38) of the carrier have a cross-section extending obliquely in such a way that at the upper edge the distance is bigger than at the lower edge.

11. Apparatus according to claim 7, characterized in that the fingers (37,38) of the carrier have a cross-section extending obliquely in such a way that at the upper edge the distance is bigger than at the lower edge.

12. Apparatus according to claim 5, characterized in that the fingers of the carrier are adapted to spread to a distance of 7–9 cm.

13. Apparatus according to claim 6, characterized in that the fingers of the carrier are adapted to spread to a distance of 7–9 cm.

14. Apparatus according to claim 7, characterized in that the fingers of the carrier are adapted to spread to a distance of 7–9 cm.

15. Apparatus according to claim 8, characterized in that the fingers of the carrier are adapted to spread to a distance of 7–9 cm.

16. Apparatus according to claim 9, characterized in that the fingers of the carrier are adapted to spread to a distance of 7–9 cm.

17. Apparatus according to claim 10, characterized in that the fingers of the carrier are adapted to spread to a distance of 7–9 cm.

18. Apparatus according to claim 11, characterized in that the fingers of the carrier are adapted to spread to a distance of 7–9 cm.

19. Apparatus according to claim 5, characterized in that the carrier includes a slide adapted to make a movement, which brings the fingers of the carrier to a height which is 4–7 cm above the height registered at the measuring station.

20. Apparatus according to claim 6, characterized in that the carrier includes a slide adapted to make a movement, which brings the fingers of the carrier to a height which is 4–7 cm above the height registered at the measuring station.

21. Apparatus according to claim 7, characterized in that the carrier includes a slide adapted to make a movement, which brings the fingers of the carrier to a height which is 4–7 cm above the height registered at the measuring station.

22. Apparatus according to claim 8, characterized in that the carrier includes a slide adapted to make a movement, which brings the fingers of the carrier to a height which is 4–7 cm above the height registered at the measuring station.

23. Apparatus according to claim 9, characterized in that the carrier includes a slide adapted to make a movement, which brings the fingers of the carrier to a height which is 4–7 cm above the height registered at the measuring station.

24. Apparatus according to claim 10, characterized in that the carrier includes a slide adapted to make a movement, which brings the fingers of the carrier to a height which is 4–7 cm above the height registered at the measuring station.

25. Apparatus according to claim 11, characterized in that the carrier includes a slide adapted to make a movement, which brings the fingers of the carrier to a height which is 4–7 cm above the height registered at the measuring station.

26. Apparatus according to claim 12, characterized in that the carrier includes a slide adapted to make a movement, which brings the fingers of the carrier to a height which is 4–7 cm above the height registered at the measuring station.

27. Apparatus according to claim 13, characterized in that the carrier includes a slide adapted to make a movement, which brings the fingers of the carrier to a height which is 4–7 cm above the height registered at the measuring station.

28. Apparatus according to claim 19, characterized in that the carrier includes a slide adapted to make a movement, which brings the fingers of the carrier to a height which is 4–7 cm above the height registered at the measuring station.

29. Apparatus according to claim 20, characterized in that the carrier includes a slide adapted to make a movement, which brings the fingers of the carrier to a height which is 4–7 cm above the height registered at the measuring station.

* * * * *